(12) United States Patent
Sadler

(10) Patent No.: US 9,567,740 B2
(45) Date of Patent: Feb. 14, 2017

(54) CATCH BASIN GRATE

(71) Applicant: Brenda Sadler, Calgary (CA)

(72) Inventor: Brenda Sadler, Calgary (CA)

( * ) Notice: Subject to any disclaimer, the term of this patent is extended or adjusted under 35 U.S.C. 154(b) by 171 days.

(21) Appl. No.: 14/460,960

(22) Filed: Aug. 15, 2014

(65) Prior Publication Data

US 2016/0047114 A1 Feb. 18, 2016

(51) Int. Cl.
*E03F 5/06* (2006.01)
*B01D 35/18* (2006.01)
*E03F 5/04* (2006.01)

(52) U.S. Cl.
CPC .............. *E03F 5/06* (2013.01); *B01D 35/18* (2013.01); *E03F 5/041* (2013.01); *E03F 2005/068* (2013.01)

(58) Field of Classification Search
CPC ........................... E04D 13/0762; B01D 35/18
USPC ............... 210/747.3, 163, 164, 165, 166, 170.03,210/184, 185; 404/2, 4, 5
See application file for complete search history.

(56) References Cited

U.S. PATENT DOCUMENTS

| | | | |
|---|---|---|---|
| 1,665,503 A | 4/1928 | McClave | |
| 2,762,448 A * | 9/1956 | Schmid | E04D 13/0409 210/166 |
| 3,914,911 A | 10/1975 | Paasch | |
| 4,544,302 A | 10/1985 | Farrelly | |
| 5,230,188 A * | 7/1993 | Nurse | E03F 5/0407 210/163 |
| 5,630,674 A * | 5/1997 | Inaba | E01O 5/22 404/2 |
| 6,051,811 A | 4/2000 | Hardison | |
| 6,360,738 B1 | 3/2002 | Brooks | |
| 6,503,390 B1 * | 1/2003 | Gannon | B01D 17/005 210/164 |
| 6,576,140 B1 * | 6/2003 | Batten | E03F 5/16 210/163 |
| 6,666,966 B1 * | 12/2003 | Schluttig | E03C 1/126 210/163 |
| 7,144,185 B2 | 12/2006 | Messerschmidt | |
| 2005/0232701 A1 | 10/2005 | Humphries | |
| 2012/0132759 A1 * | 5/2012 | Sager | E04D 13/0762 248/49 |
| 2014/0090311 A1 * | 4/2014 | Iannelli | E04D 13/0762 52/12 |

FOREIGN PATENT DOCUMENTS

| | | |
|---|---|---|
| CA | 1185474 | 4/1985 |
| CN | 203201046 U | 9/2013 |
| WO | 90/12166 A1 | 10/1990 |

* cited by examiner

*Primary Examiner* — Christopher Upton
(74) *Attorney, Agent, or Firm* — McQIPLaw; Jeffrey McQuiston

(57) ABSTRACT

Disclosed herein are catch basin grate covers comprising a frame; a grate; a heating element in thermal communication with the grate cover; and a power source in electric communication with the heating element. Also disclosed are catch basin grate covers comprising a frame; a grate; means for heating the grate cover; and means for supplying power to the means for heating. Also disclosed are methods of preventing the clogging of a catch basin grate cover due to ice, the method comprising applying electricity to the heating element of the above grate cover, whereby the resulting heat from the heat element causes the ice to thaw, thereby unclogging the catch basin grate cover.

4 Claims, 2 Drawing Sheets

CATCH BASIN GRATE

FIELD OF THE INVENTION

The present invention is in the field of grates covering drainage pipes.

BACKGROUND OF THE DISCLOSURE

A catch basin is a basin that on one side is open to the elements, and on another side connects with a sewer or drainage system. Typically, catch basins are located at a low point in a drainage plane, for example in a park, or at a street corner, or where a street has a dip. Water from the rain, snow, or irrigation flows into the catch basin and drains through the sewer system. Normally, a catch basin is covered by a grated plate that prevents large debris, such as tree branches or garbage, to fall into the catch basin and clog the drainage system. During the cold winter months, water on or around the grated plate freezes and prevents the normal drainage of melted snow. This causes for water to accumulate and freeze over the grated plate, which poses a danger to anyone walking or driving in the affected area. Therefore, there is a need in the art for a mechanism to prevent the catch basin grate from freezing in winter.

SUMMARY OF THE INVENTION

Disclosed herein are catch basin grate covers comprising a frame; a grate; a heating element in thermal communication with the grate cover; and a power source in electric communication with the heating element. Also disclosed are catch basin grate covers comprising a frame; a grate; means for heating the grate cover; and means for supplying power to the means for heating. Also disclosed are methods of preventing the clogging of a catch basin grate cover due to ice, the method comprising applying electricity to the heating element of the above grate cover, whereby the resulting heat from the heat element causes the ice to thaw, thereby unclogging the catch basin grate cover.

DETAILED DESCRIPTION OF THE EMBODIMENTS

Disclosed herein are systems and methods by way of which a catch basin grate is equipped with an electric heating element that heats a catch basin grate to either prevent water from freezing on the grate or thaw any ice formed on the grate.

Figure 1:
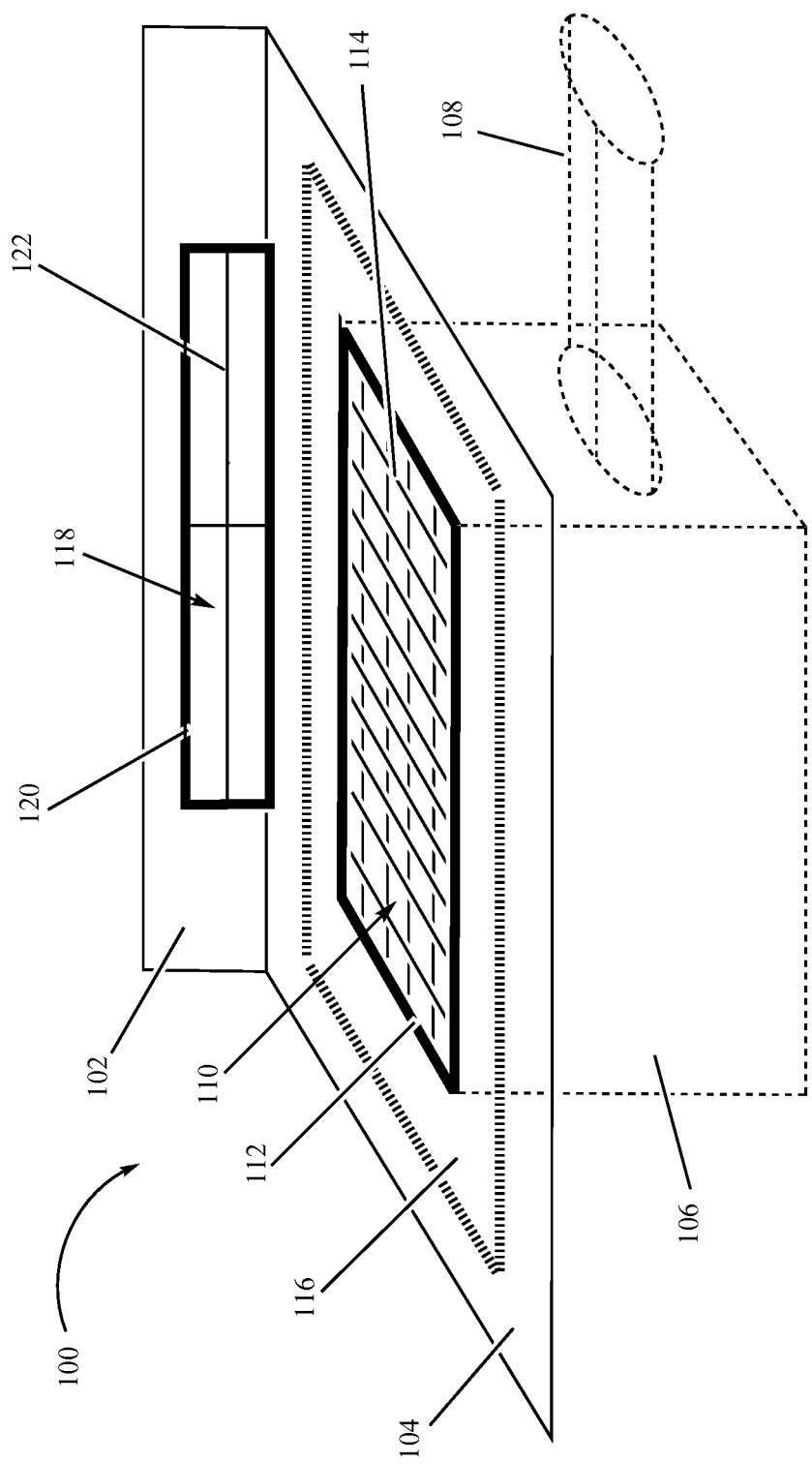
FIG. 1 is an illustration of a typical catch basin grate in a street gutter.

Referring now to the drawings, FIG. 1 shows an example of a curbside gutter system 100 on a street. The gutter system 100 comprises a curb 102, whose plane is generally perpendicular to the plane of the street. The gutter system also comprises a gutter 104, whose plane is generally coextensive with the plane of the street. The street is not shown. A catch basin 106 is located under the gutter 104. The catch basin 106 is connected to the sewer lines 108 on the one side and is covered by a grate cover 110 on top.

The grate cover 110 comprises a frame 112 and a grate 114. The grate 114 is designed to fit in the frame and to allow for water to flow through the grate 114 and into the catch basin 106. In some embodiments, the grate 114 is slotted. In other embodiments, the grate 114 is a mesh. In other embodiments, the grate 114 is a plate comprising a plurality of holes. In some embodiments, for example the one shown in FIG. 1, the frame 112 is nestled within a concrete slab 116 (shown by the hatched border in FIG. 1). In some embodiments, the concrete slab 116 is part of the gutter 104. In other embodiments, the concrete slab 116 is separate from the gutter 104. In some embodiments, the frame 112 is embedded in the concrete slab 116. In some of these embodiments, the grate 114 is removable.

In some embodiments, the catch basin 106 and the grate cover 110 are not part of a street gutter system. In these embodiments, the catch basin 106 is located at a low point in a drainage basin, for example in a park, in a field, on the side of a road, in a parking lot, and the like. A catch basin not associated with a gutter system is at times called an area drain.

In some embodiments, for example the one shown in FIG. 1, gutter system 100 comprises a storm back 118 located in the curb 102. The storm back 118 comprises a frame 120 and a grate 122. The grate 122 is analogous to the grate 114, described above. In certain embodiments, the gutter system 100 does not have the storm back 118. Similarly, in some of the embodiments where the catch basin 106 is not associated with a gutter, no storm back 118 exists.

In some embodiments, the frame 112, the grate 114, the frame 120 and the grate 122 is each independently made up of a heat conducting material. In some of these embodiments, the heat conducting material is a metal. In certain embodiments, the metal is iron, steel, or a metallic alloy.

Figure 2:
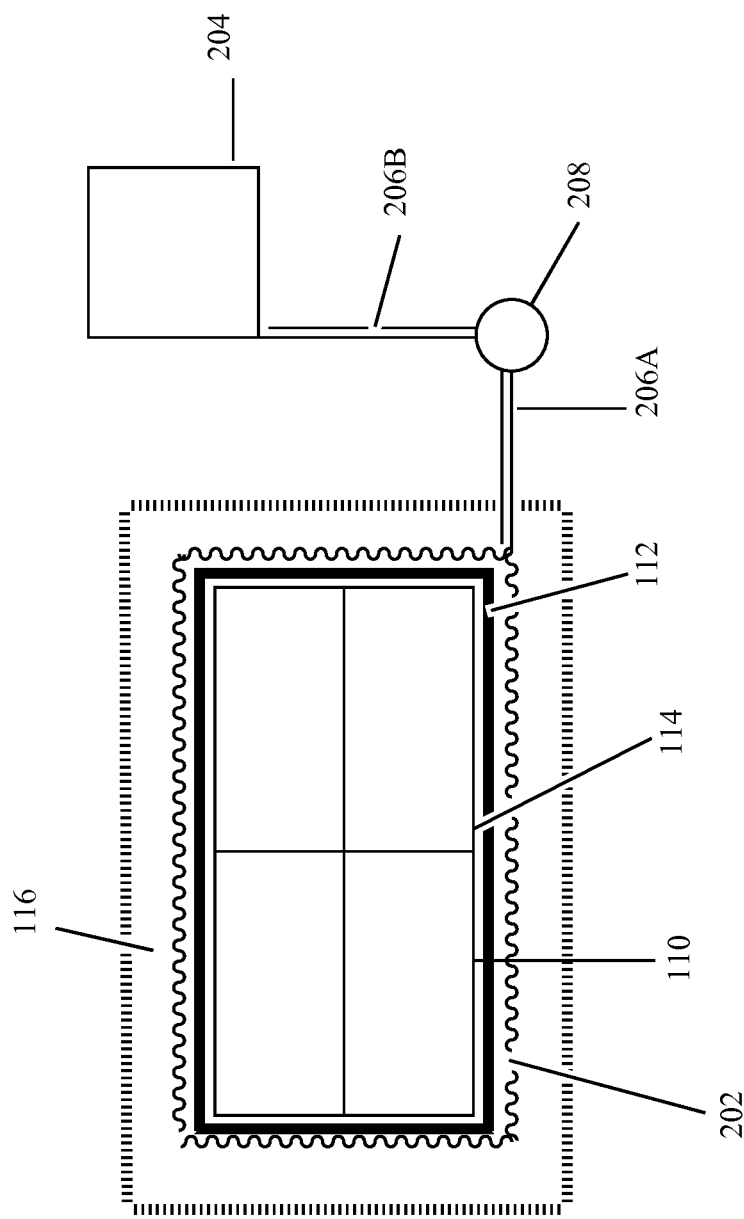
FIG. 2 is a top view of an embodiment of the catch basin grate, showing the heating element, and the electrical connections to a power source.

FIG. 2 shows a top view of an embodiment of the grate cover 110. The grate 114 is shown in a simplified form for clarity. In some embodiments, the grate cover 110 is thermal communication with a heating element 202. In some embodiments, the thermal communication is between the heating element 202 and the frame 112. In other embodiments, the thermal communication is between the heating element 202 and the grate 114. In some embodiments, the heating element 202 is a heat tape. In certain embodiments, the heat tape is water proof. In other embodiments, the heating element 202 is a wire, which is optionally a coiled wire. In some of these embodiments, the wire is insulated so that there is no electrical connectivity with the environment, to avoid accidentally delivering an electric shock to passersby. In some embodiments, the heating element 202 is also insulated to protect it from the elements, for example, water, ice, salt water (for winter road conditions), and/or heat (during the summer months). The use of any heating element that converts electrical current to heat is contemplated.

In some embodiments, the heating element 202 is embedded in the concrete slab 116. The heat from the heating element 202 is transferred by conductance through the concrete slab 116 to the frame 112 and the grate 114. In other embodiments, the heating element 202 physically touches the frame 112. In other embodiments, the frame 112 comprises a groove (not shown) into which the heating element 202 is placed.

The heating element 202 is in electrical communication with a power source 204 through wires 206 (in embodiments where there is no transformer 208, see below, the wire 206 is a combination of wires 206A and 206B). In some embodiments, the power source 204 is a street light, or wires that power a street light. In other embodiments, the power source 204 is a battery. In certain embodiments, the power source 204 is a solar cell that generates electricity from sun light, and optionally stores it in a battery. In other embodiments, the power source 204 is a transformer that converts the street voltage of 110 V or 220 V to a safer voltage, for example 12 V, to avoid accidental electric shocks to passersby. Any other source of electrical energy, for example any other wire that is connected to a power source is contemplated.

In some embodiments, a thermostat 208 is placed in series between the power source 204 and the heating element 202. The thermostat 208 is in electrical communication with the heating element 202 through the wire 206A, and with the power source 204 through the wire 206B. The thermostat 208 closes the circuit between the power source 204 and the heating element 202 when the ambient temperature falls below a pre-set value, for example 32° F. (0° C.), and opens the circuit when the ambient temperature rises above the pre-set value.

In some embodiments, an analogous system as discussed above exists for the storm back 118. Thus, in FIG. 2, frame 120 can replace frame 112, and grate 122 can replace grate 114 to provide the analogous system.

In some embodiments, for example that shown in FIG. 1, both the grate cover 110 and the storm back 118 are provided. In some of these embodiments, both the grate cover 110 and the storm back 118 comprise the heating element 202 and the connection to the power source 204. In other embodiments, only one of the grate cover 110 and the storm back 118 comprises the heating element 202 and the connection to the power source 204.

In some of the embodiments where both the grate cover 110 and the storm back 118 comprise the heating element 202 and the connection to the power source 204, both the grate cover 110 and the storm back 118 connect to the power source 204 through the same wire 206. In these embodiments, the wire 206 splits, optionally distal to the thermostat 208, and one set of wires connects with the grate cover 110 and another set of wires connects with the storm back 118. In other embodiments, each of the grate cover 110 and the storm back 118 connects with the power source 204 independently. In some of these embodiments, the flow of electricity into each of the grate cover 110 and the storm back 118 is optionally and independently regulated by a thermostat.

In some embodiments, a sacrificial anode is provided to prevent the corrosion of the grate cover, its frame, and/or its grate.

What is claimed is:

1. A catch basin grate cover comprising:
   a frame;
   a grate;
   a heating element in thermal communication with the frame and/or grate; and
   a power source in electric communication with the heating element,
   wherein the heating element is heat tape and/or a wire disposed about a perimeter of said frame and/or grate, and wherein the catch basin grate is installed in a curbside gutter system or an outdoor drainage basin.

2. The grate cover of claim 1, wherein the power source is selected from the group consisting of a street lamp, a solar cell, a battery, and a transformer.

3. A catch basin grate cover comprising:
   a frame;
   a grate;
   means for heating the frame and/or grate; and
   means for supplying power to the means for heating,
   wherein the means for heating is provided by heat tape and/or a wire disposed about a perimeter of said frame and/or grate, and wherein the catch basin grate is installed in a curbside gutter system or an outdoor drainage basin.

4. A method of preventing the clogging of a catch basin grate cover due to ice, the method comprising applying electricity to the heating element of the grate cover of claim 1, whereby the resulting heat from the heat element causes the ice to thaw, thereby unclogging the catch basin grate cover.

* * * * *